(12) United States Patent
Linke et al.

(10) Patent No.: US 7,178,139 B2
(45) Date of Patent: Feb. 13, 2007

(54) EXECUTABLE FILE SYSTEM FOR AN EMBEDDED COMPUTER

(75) Inventors: Scott L. Linke, Flora, IN (US); Kirk A. Bailey, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 568 days.

(21) Appl. No.: 10/229,832

(22) Filed: Aug. 27, 2002

(65) Prior Publication Data

US 2004/0044708 A1     Mar. 4, 2004

(51) Int. Cl.
*G06F 9/44* (2006.01)

(52) U.S. Cl. ..................................... 717/162
(58) Field of Classification Search ............... 717/162, 717/168, 139–141, 105, 135, 170, 121; 707/205; 718/104; 709/203, 206; 710/109; 711/118; 715/744

See application file for complete search history.

(56) References Cited

U.S. PATENT DOCUMENTS

| 15,943 | A | * | 10/1856 | Chen ................................. 5/3 |
| 5,581,768 | A | * | 12/1996 | Garney et al. .............. 718/104 |
| 5,640,567 | A | * | 6/1997 | Phipps ....................... 717/121 |
| 5,838,910 | A | * | 11/1998 | Domenikos et al. ........ 709/203 |
| 5,923,878 | A | * | 7/1999 | Marsland .................... 717/139 |
| 6,035,120 | A | * | 3/2000 | Ravichandran .............. 717/141 |
| 6,047,354 | A | * | 4/2000 | Yoshioka et al. ........... 711/118 |
| 6,061,057 | A | * | 5/2000 | Knowlton et al. .......... 715/744 |
| 6,128,684 | A | * | 10/2000 | Okayama .................... 710/109 |
| 6,449,764 | B1 | * | 9/2002 | Sliger et al. ................ 717/170 |
| 6,487,713 | B1 | * | 11/2002 | Cohen et al. ............... 717/105 |
| 6,497,135 | B1 | | 12/2002 | Sanders et al. |
| 6,804,814 | B1 | * | 10/2004 | Ayers et al. ................ 717/135 |
| 2003/0061292 | A1 | * | 3/2003 | Underseth et al. .......... 709/206 |
| 2004/0015943 | A1 | * | 1/2004 | Chen .......................... 717/168 |

OTHER PUBLICATIONS derek Rayside et al., "Compact Java Binaries for Embedded Systems", Nov. 1999, IBM Press, Proceedings of the 1999 conference of the Centre for Advanced Studies on Collaborative research.*

* cited by examiner

*Primary Examiner*—Wei Zhen
*Assistant Examiner*—Anna Deng
(74) *Attorney, Agent, or Firm*—Jimmy L. Funke

(57) ABSTRACT

Binary files in an executable file system can be directly executed by the central processing unit at the location in which the binary files are stored. A pre-runtime tool can traverse a replica directory hierarchy in a host/loading computer to fill an internal data structure which can be used to generate a binary file that can be loaded directly into the embedded computer. The central processing unit (CPU) and its components such as the address bus, data bus, and program counter, can directly interact with unit of storage interface mechanisms, such as read/write means, identifying location means, and concatenation means. In some embodiments, the page size in the memory management unit (MMU) of the CPU is set to the same size as the unit of storage.

12 Claims, 6 Drawing Sheets

PRIOR ART FILING SYSTEM

PRIOR ART FILING SYSTEM

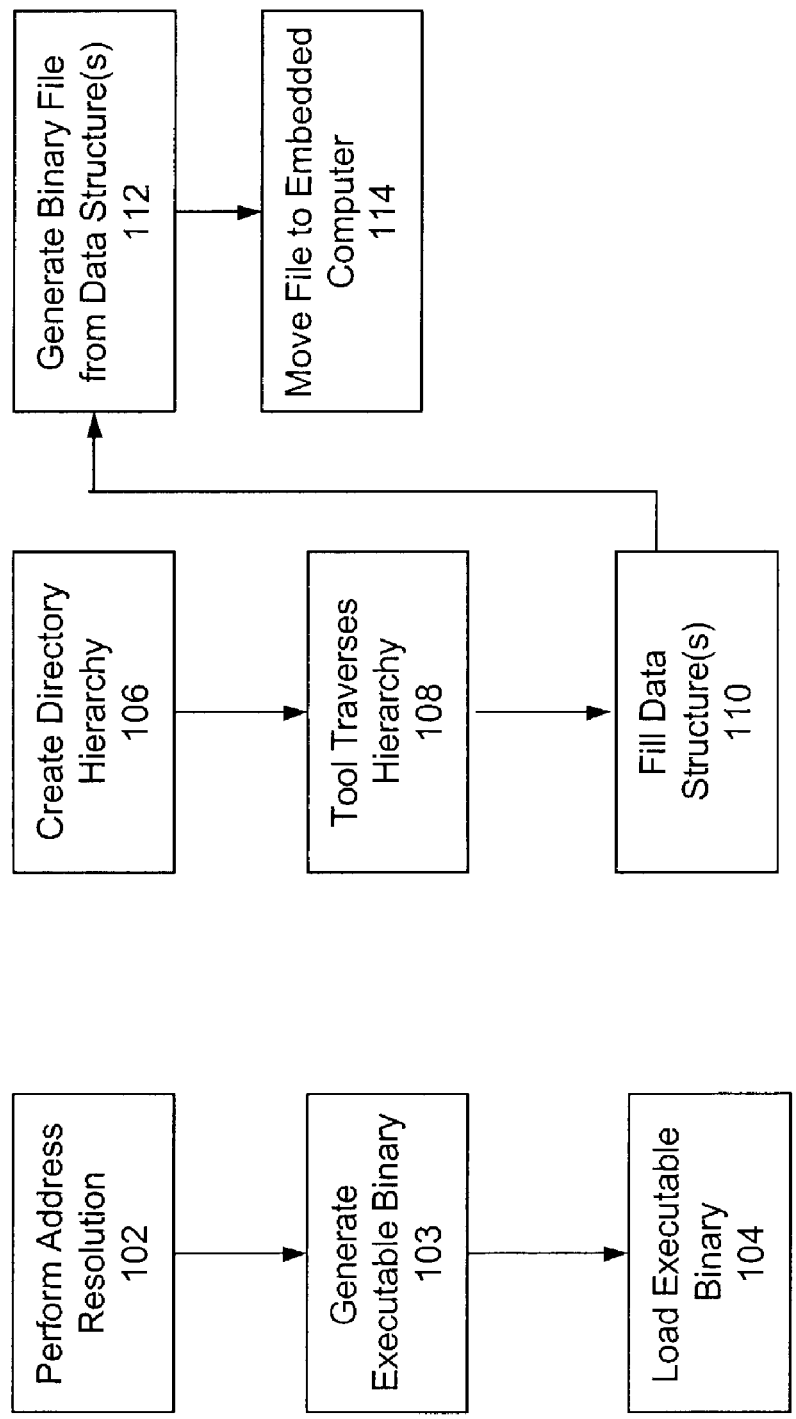

EXECUTABLE FILE SYSTEM FOR AN EMBEDDED COMPUTER

BACKGROUND OF THE INVENTION

1. Technical Field

The present invention relates generally to the use of file systems. More specifically, the present invention relates to use of file systems in an embedded computer that can execute binary files in the same memory location in which they are stored by the file system.

2. Background of the Invention

Embedded computers are being used in an ever increasing number and variety of devices. Vehicles, industrial equipment, consumer electronics, and other devices are becoming increasingly dependent upon the use of embedded computers and the software applications ("computer programs") run on those embedded computers. Unlike "general purpose computers" such as laptops, desktop PCs, work stations, and mainframe computers, embedded computers are limited purpose computers that serve specific purposes with regard to the device incorporating the embedded computer. For example, embedded computers are used in a variety of subsystems in an automobile, such as anti-lock brakes, airbag controllers, global positioning applications, and fuel transmission systems. The programming languages used to program general purpose computers are increasingly being used to program embedded computers for specialized devices. Just as general purpose computers have file systems that store software components such as binary executable files, other data files, and even shared libraries of files, embedded computers also have file systems that store a wide range of different software components.

Embedded computers are typically more sensitive to memory constraints than general purpose computers. At the same time, performance requirements for an embedded computer can be less forgiving than for a general purpose computer because the performance problems in an embedded computer will often have an immediate impact in the physical non-virtual world. For example, safety devices in a vehicle need to operate at levels that far exceed a word processing program in a general purpose computer. Embedded computers require sufficient memory to generate reliable processing results in a real-time manner. Moreover, embedded computers cannot take advantage of the flexibility that is available to general purpose computers. For example, general purpose computers can alter which computer programs are running at a particular time. Office support software on a general purpose computer can be shut down when a graphics-intensive computer game is to be played. End-users of embedded computers generally do not have the same flexibility to load or unload software. Moreover, memory capabilities in a general purpose computer can benefit each of the applications that can potentially be housed on that general purpose computer. The cost of additional memory can thus be divided up amongst all of the applications on the computer. In contrast, memory capabilities in an embedded computer cannot easily be utilized by other embedded computers. A device can incorporate many different embedded computers and yet be unable to exchange memory between them, with no embedded computer able to access any excess memory in any other embedded computer. All of these factors can make embedded computers more sensitive to memory constraints.

Accentuating memory constraints in both general purpose computers and embedded computers is the increasing reliance on reusable libraries housing shared software components. The dependencies of such libraries are typically resolved at runtime, requiring an extra copy of the software components to be placed into memory. Extra copies of other software components including executable binary files and non-executable files are also made. Such memory consumption makes the embedded computer, and devices incorporating the embedded computer, more expensive. Unlike situations involving general purpose computers, the user of an embedded computer cannot take action to alleviate memory consumption. It would be desirable if memory in an embedded computer could be conserved by avoiding the creation of extra-copies of software components in the execution of computer programs. Prior art central processing units (CPUs) require data to be in contiguous memory. It would be desirable if a file system could be structured such that software components can be executed by the CPU where the software components are stored.

SUMMARY OF THE INVENTION

The invention is an executable file system that allows the central processing unit (CPU) to execute computer programs as they are stored in the file system, without having to load an additional copy of the computer program into memory for execution purposes.

The CPU, and its various components such as the data bus, address bus, and program counter can directly interact with unit of storage interface processes, such as read/write means, identifying location means, and concatenation means, without needing to use the file system to do so. In a preferred embodiment, the page size of the memory management unit (MMU) of the CPU is equal in size to the unit of storage.

In some embodiments, a host/loading computer (with a directory hierarchy replicated from the directory hierarchy in the embedded computer) uses a pre-runtime tool for traversing the replica hierarchy, filling a data structure used to generate a binary file to be loaded into the executable file system in the embedded computer.

The foregoing and other functionality and features of the invention will be more apparent from the following description when taken in connection with the accompanying drawings.

BRIEF DESCRIPTION OF THE DRAWINGS

The present invention wills now be described, by way of example, with reference to the accompanying drawings, in which:

FIG. 7 is a flow chart illustrating one example of how an executable binary file can be loaded into an embedded computer.

FIG. 8 is a more detailed flow chart illustrating one example of how an executable binary file can be loaded into an embedded computer.

DESCRIPTION OF THE PREFERRED EMBODIMENT

I. Overview

The invention is any method or system of allowing a central processing unit to execute a software component from within the file system in which the software component is stored. By allowing programs to be executed by the CPU from within the file system, and without loading an extra copy of the software component into memory, memory within the embedded computer is conserved.

Figure 1:
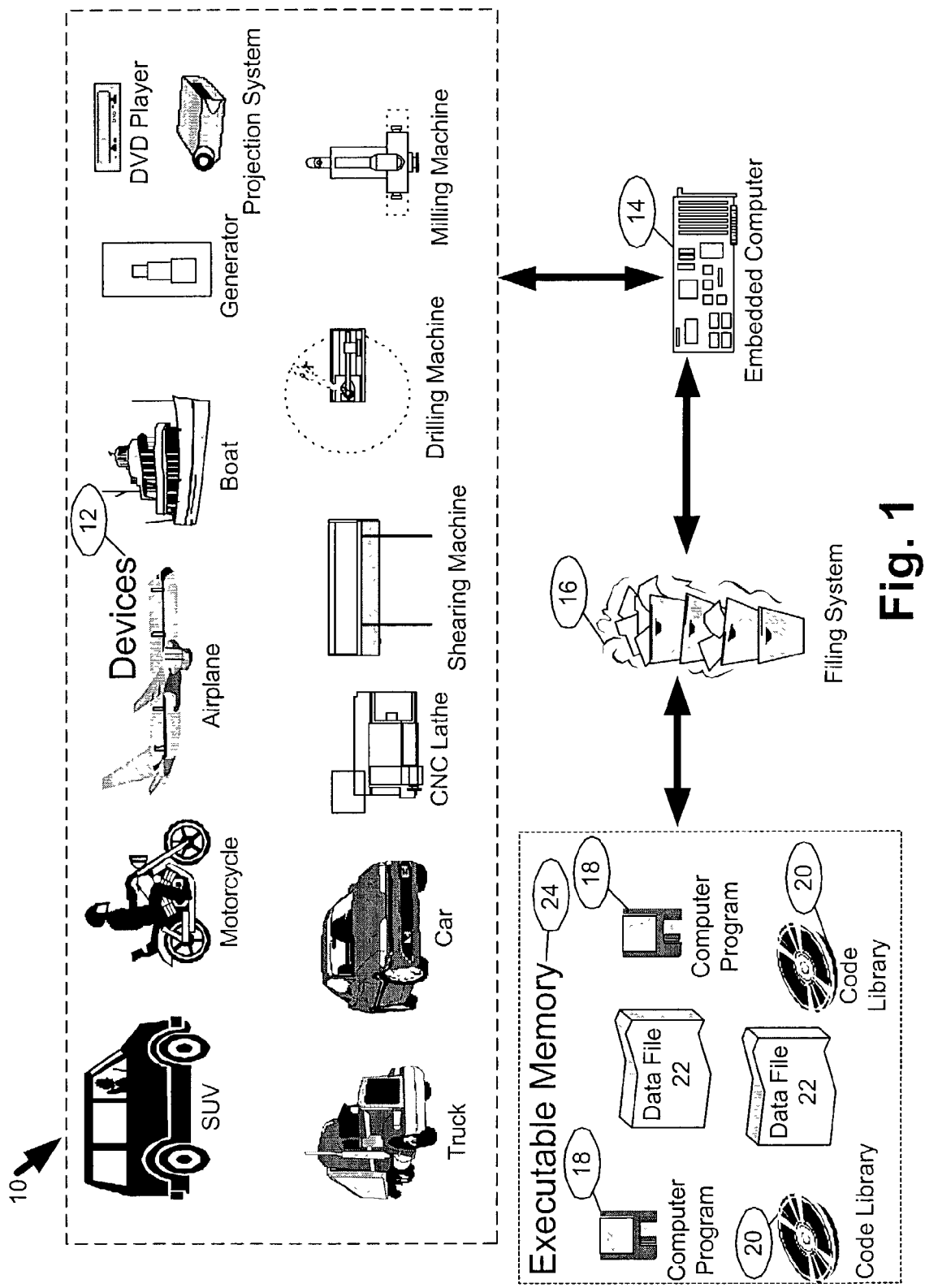
FIG. 1 is a high-level environmental diagram illustrating some examples of how executable file systems in embedded computers can be utilized in a wide variety of different devices.

FIG. 1 discloses high-level block diagram of an executable filing system ("executable file system" or simply the "system") 10 that minimizes memory usage in an embedded computer 14. The system 10 can be incorporated into embedded computers 14 that perform a wide range of functions; any function that can potentially be programmed into the embedded computer 14. The embedded computer 14 can itself be incorporated into a wide variety of devices 12. A device 12 is any machine, tool, or object that incorporates one or more embedded computers 14. Devices 12 can include vehicles such as sport utility vehicles ("SUV"), motorcycles, airplanes, boats, trucks, cars, and any other type of vehicle that incorporates an embedded computer 12. Industrial equipment such as generators, CNC Lathe machines, shearing machines, drilling machines, milling machines, forklifts, and any other industrial equipment that incorporates an embedded computer 14 is a device 12. Consumer products that can constitute devices 12 with embedded computers 14 include such items as DVD players, projection systems, CD players, video cameras, video game systems, digital cameras, and other electronic devices incorporating embedded computers 14. Any item or object (including even biological life forms) that can incorporate an embedded computer 14, can constitute a device 12 incorporating the system 10.

Just as a wide variety of different embedded computers 14 can be incorporated into wide variety of different devices 12, a wide variety of different computer programs 18 and other software components can be incorporated into a wide variety of different embedded computers 14. The system 10 can incorporate a wide variety of different computer programs 18, in terms of function, programming language, and structure. Embedded computers 14 are incorporated into devices 12 for specific purposes. In contrast to general purpose computers such as desktop PCs, mainframe computers, and laptop computers, embedded computers 14 often exist for the purpose of aiding in the functioning, tracking, data collecting, or other process ancillary or supplementary to a device 12. In contrast, a general purpose computer is almost always ancillary or supplementary in purpose to the computer programs 18 running on the general purpose computer. A general purpose computer exists to provide flexibility with regards to the running of computer programs 18. In contrast, the operating interface of an embedded computer 14 generally provides minimal flexibility to add, delete, or alter in any way, the computer programs 18 located within it. The operating interface with respect to a general purpose computer is generally capable of erasing every file from memory.

There are a potentially voluminous number of examples of the different types of functions performed by embedded computers 14. The embedded computer 14 in industrial equipment such as a drilling machine can be used to control the speed in which a drill is to function. The embedded computer 14 in a consumer item such as a DVD player can facilitate the ability of the DVD to read the content of a DVD, and transmit the contents to a television set or monitor. Embedded computers 14 in vehicles can perform functions closely relating to the transportation function such as anti-lock braking systems, regulating fuel injection systems, and navigation systems such as global position services. Embedded computers 14 can also be used by consumer electronic devices incorporated into the computer network in a vehicle, such as DVD players, satellite radio, and a wide range of other devices 12.

Embedded computers 14 can include a wide variety of different computer architectures. The embedded computer 14 in the system 10 can also include entire networks of embedded computers 12. For example, all of the electronic devices in a vehicle can be connected to a single network or multiple networks. In such embodiments, the system 10 can incorporate the entire network.

Embedded computers 14 have the capability of running one or more different computer programs 18. Computer programs 18 in embedded computers 14 can perform a wide variety of different functions. For example, one computer program 18 in a DVD may be used to play a DVD at a normal speed while another computer program 18 could be used to play the DVD at an accelerated or "fast forward" speed. In vehicles such as automobiles, one computer program 18 can be used to optimize the firing of pistons in a combustion engine, while a different computer program 18 can be used to automatically change gears in an automated transmission, while yet a different computer program 18 can be used to automatically pump and release the brakes for anti-locking brakes. The number of potential uses for computer programs 18 in devices 12 such as vehicles, industrial equipment, consumer electronics equipment, and other devices 12 is potentially limitless. Any such device 12 capable of incorporating an embedded computer 14 is capable of running a computer program 14 in the embedded computer 12, and thus is capable of benefiting from the system 10.

Computer programs 18 do not perform their functions without assistance from other types of software components. A data file 22 can be used by one or more different computer programs 18 in order for the computer program to carry out its programming. For example, computer programs 18 relating to a vehicle may utilize a data file 22 of vehicle characteristics in order to specifically tailor the computer program 18 to the particular vehicle type. A code library 20 can consist of reusable code modules with functions that can be accessed by several different computer programs 20. Computer programs 18, code libraries 20, data files 22, and other types of software and files (collectively "software components") can be organized by a file system 16 (or "filing system"). The executable file system 10 can incorporate existing prior art filing system 16.

In a preferred embodiment, executable filing systems 10 are not created by changing prior art filing systems 16. Instead, the functionality of executable filing systems 10 is achieved by changing the way a central processing unit (CPU) in the embedded computer 14 interacts with the underlying memory units in the embedded computer 14. The functionality of the system 10 is achieved by storing all software components in an executable memory 24 within the filing system 16, as opposed to requiring the CPU to load a separate copy of all software components in a memory component that is distinct from the memory component in which the software components are stored.

II. Prior Art Filing System

Figure 2:
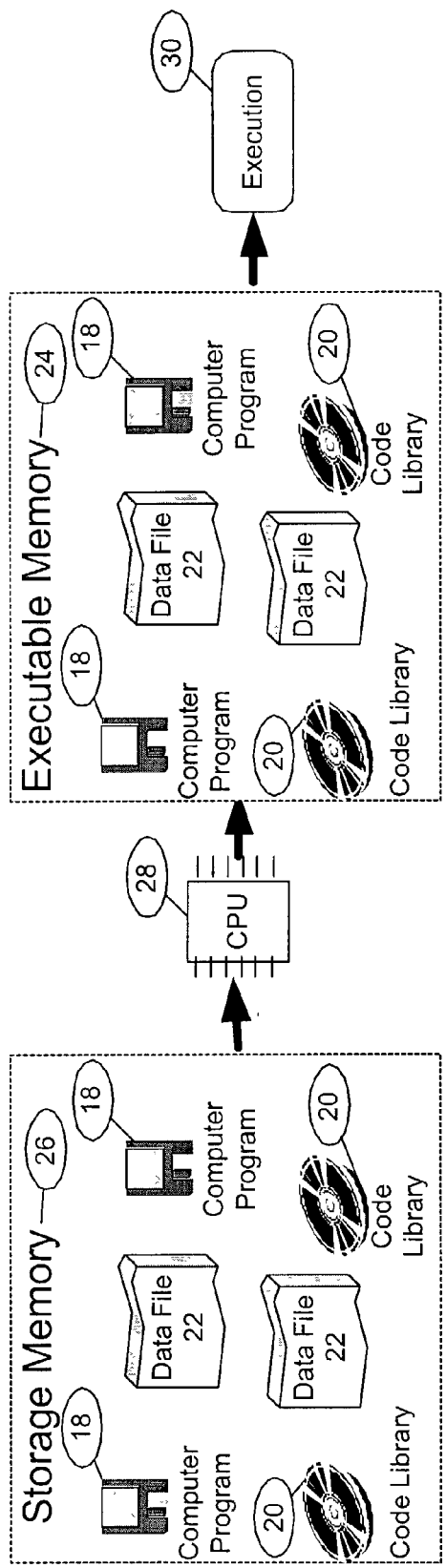
FIG. 2 is a process flow diagram illustrating how prior art non-executable file systems require the CPU to load an additional copy of the executed software components in memory.

FIG. 2 is a process flow diagram illustrating an example of a prior art filing system. The prior art filing system 16 includes a storage memory component 26 that includes a variety of computer programs 18, code libraries 20, data files 22, and other software components. A central processing unit (CPU) 28 can access the storage memory component 26 through the filing system 16, but the CPU cannot access the storage memory component 26 directly in order to execute one or more computer programs 18. Instead, the CPU 28 loads the software components in the storage memory 26 into the executable memory 24 where such components can then be executed at 30.

File systems 16 were created to manage and store the use software components. Typical file systems 16 were designed to manage the storage capabilities of magnetic media, such as tape, floppy disks, hard drives, and other mechanisms. As the cost of semiconductor memory came down, such file systems 16 were migrated to random access memory (RAM) and read only memory (ROM). The benefit of this migration was in terms of faster access speed, reduced access latency (e.g. unnoticed unavailability), and increased transfer bandwidth. However, file systems 16 still retain certain limitations as a result of the migration from storage management functions. The necessity of creating duplicative copies of storage memory 26 software components in order to run those components is a result of the historical development of filing systems 16. The software components in storage memory 26 are not binary files, while the software components in executable memory 24 are binary files. An executable binary file is a file consisting of executable code (e.g. "object code"), as distinguished from files consisting of human-readable ASCII text or other human-readable formats such as "source code", or other unreadable binary formats such as audio/video data, compressed data or otherwise encoded data. In prior art systems, only contiguous memory can be access by the CPU, and thus even statically linked files require creating an extra "copy" of the files.

Figure 3:
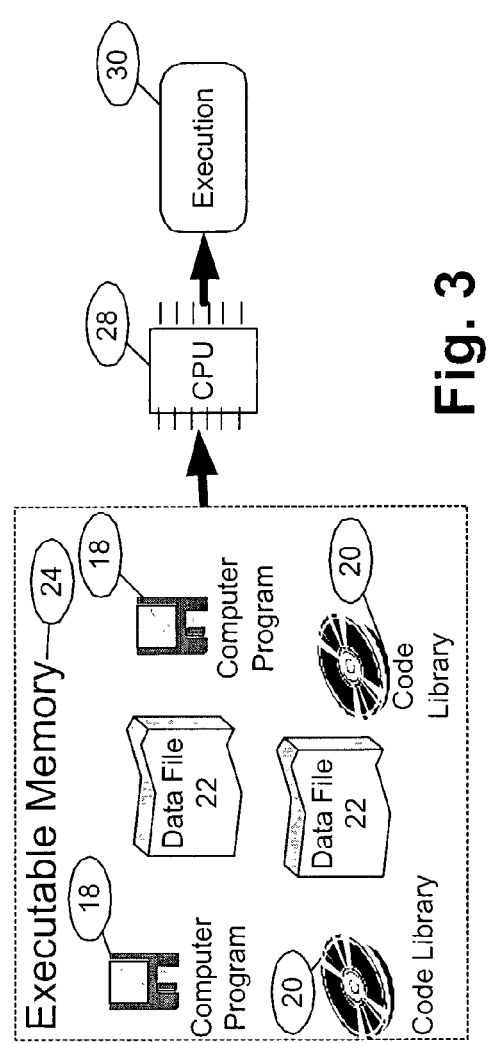
FIG. 3 is a process flow diagram illustrating one example of how software components in an executable file system can be executed directly by the CPU from with the file system.

In contrast to FIG. 2, FIG. 3 illustrates an example of the system 10. The software components required to be in binary form are stored in a binary form within the filing system 16. Thus, the software components are already in an executable memory 24 as opposed to a storage memory component 26 as in FIG. 2.

In the system 10, executable software components in the filing system 16 are stored in the form of a binary file, and thus the CPU 28 can execute the components at 30 without needing to make an additional copy of the components. In some preferred embodiments, data files 22 and code libraries 20 are also stored as binary files by the system 10. In alternative embodiments, either data files 22 and/or code libraries can be kept as non-binary files.

Figure 4:
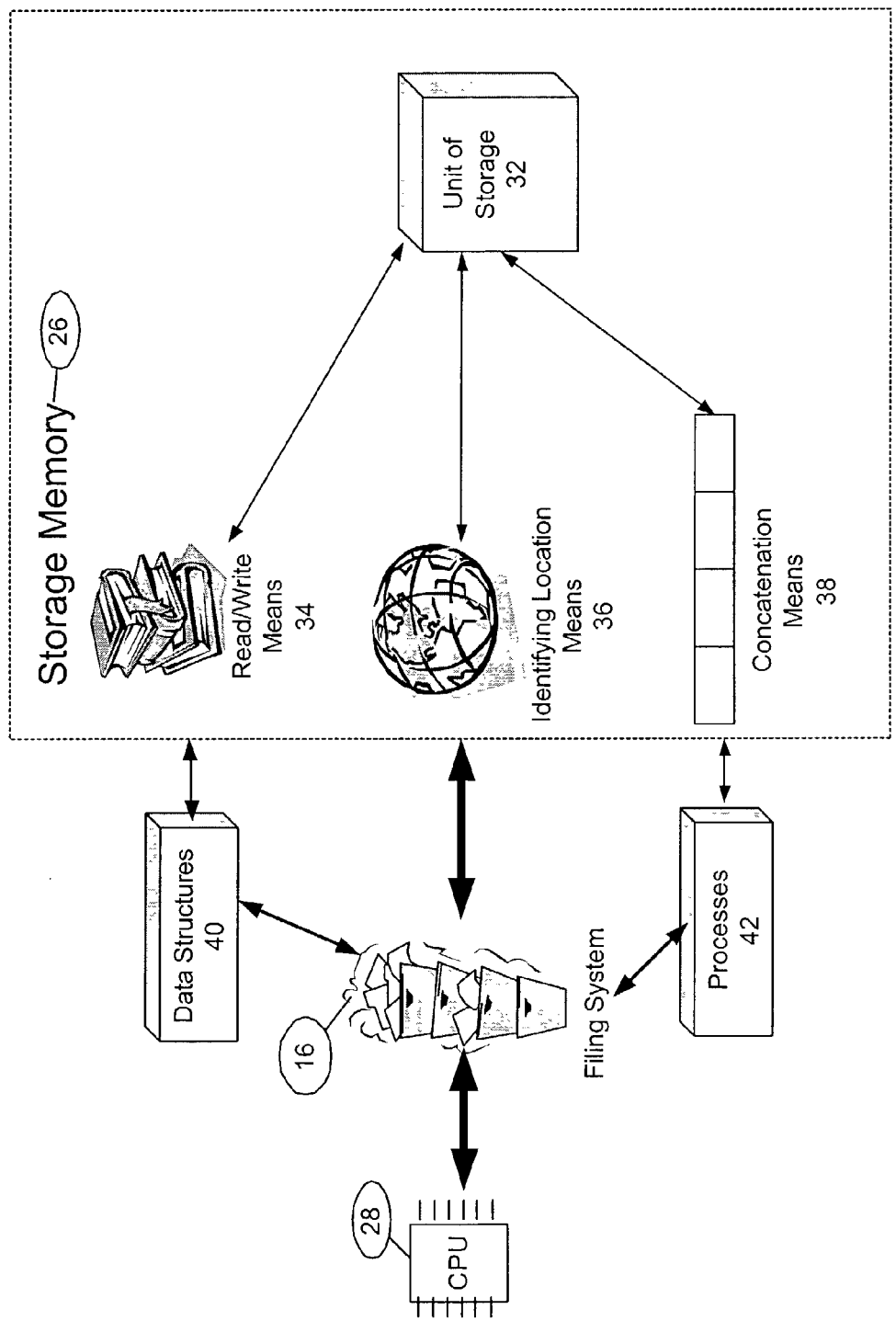
FIG. 4 is a process flow diagram illustrating how in a prior art non-executable filing system, the CPU needs to interact with unit of storage interface processes through the use of the file system and its data structures and processes

One of the differences between the prior art and the system 10 is the ability of the CPU to interact with software components without the assistance of the filing system 16. FIG. 4 is a process flow diagram illustrating some of the weaknesses of prior art filing systems 16. Filing systems 16 involve a unit of storage ("unit" or "storage unit") 32, a means for reading and/or writing to the unit ("read/write means") 34, means for identifying the location of a unit ("identifying location means") 36, and means for concatenating units ("concatenating means") 38. Read/write means 34, identifying location means 36, and concatenating means 38 (e.g. combining storage units together) can be collectively referred to as storage unit interface ("unit interface means").

As illustrated in FIG. 4, the CPU 28 cannot directly interact with the unit interface means. Instead, the CPU relies on the file system 16, which uses its processes 42 and data structures 40 to interact with the storage memory 26 components such as storage units 32 and unit interface means.

Because file systems arose as storage and retrieval systems, a typical storage unit is the size of 512 bytes. Thus storage unit size arose from the physical constraints of an archaic magnetic memory technology. Future storage media have evolved, however, compatibility concerns have caused many filing systems 16 to continue using a 512 byte storage unit 32.

Additional obstacles to executable file systems 10 can be found in the dynamic nature of prior art file systems 16. File systems 16 are dynamic in nature. The process of storing, accessing, and removing data is ongoing, at least with respect to general purpose computers. The same cannot be said for embedded computers 14, but technology developments with respect to general purpose computers tend to dominate the programming art, even with respect to embedded computers 14. Thus, developments that focus on enhancing the dynamic nature of the various software components at the expense of memory constraints. As mentioned above, embedded computers 14 are more sensitive to memory constraints than general purpose computers are. Moreover, the importance of dynamic file access is much greater in the context of the flexibly processing provided by general purpose computers. In an embedded computer 14 with a fixed subset of computer programs 14, dynamic file storage has much few inherent advantages. However, programming techniques tend to permeate from the world of general purpose computing.

III. Executable File Systems

Figure 5:
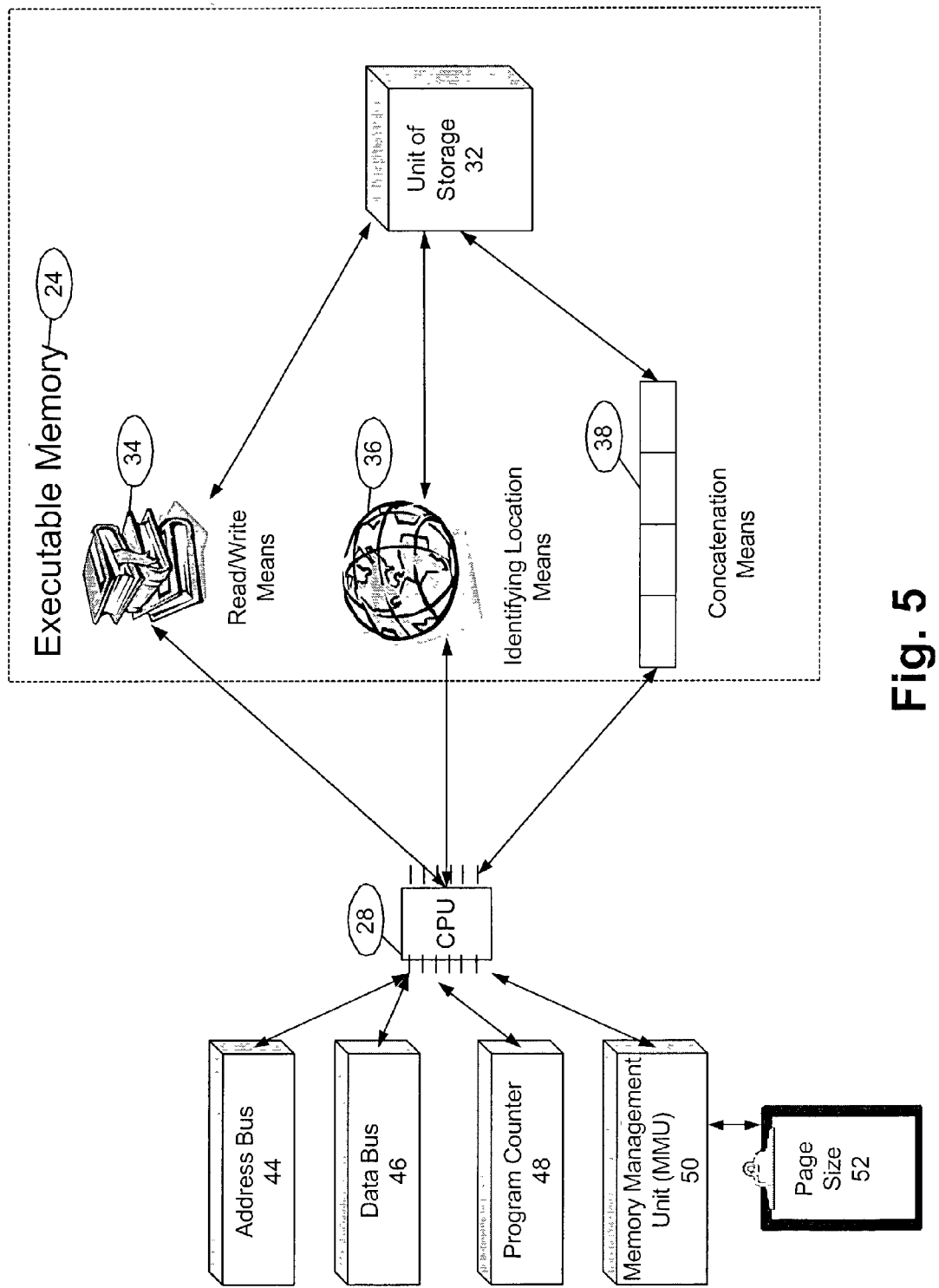
FIG. 5 is a process flow diagram illustrating one example of how a CPU and some of its various components, can interact directly with unit of storage interfaces in an executable file system.

FIG. 5 is a process flow diagram illustrating an example of the system 10. Unlike with prior art filing systems 16, the CPU can directly interact with the unit interface means, including the read/write means 34, the identifying location means 36, and the concatenating means 38. This is desirable because storage filing systems 16 are dynamic. The means for locating and concatenating units of storage 32 preferably allow for non-contiguous storage. This means that one unit of storage 32 does not have to be physically near a subsequent one. A data structure within a unit of storage 32 can point to where the next units of storage 32. Thus, for a CPU 28 to be able to directly execute from a file system 16, the CPU must be able to map to the file systems 16 means for interacting with storage units 32.

The CPU 28 has various components that are also able to directly interact and control the unit interface means. An address bus 44 processes and/or transmits address information. A data bus 46 processes and/or transmits data. A program counter 48 is a small high speed memory circuit within the CPU that contains the address location of the instruction to be executed next in the program sequence. The address bus 44, data bus 46, program counter 48, and other CPU components can collectively be referred to as "CPU components."

One example of such a component is a memory management unit (MMU) 50. The MMU 50 can place an additional requirement on the system 10. Modern operating systems ("OS") supports the functionality of mapping virtual memory addresses to physical memory addresses. The concepts of protected (e.g. physical) memory and virtually memory use specialized address translation services in an MMU 50. The MMU 50 can map a page of addresses into another address range and restrict access to a page, e.g. a fixed-size block of memory. Thus, a page size 52 of the MMU 50 can constrain the size of a unit of storage 32 in the system 10. In a preferred embodiment, the page size 52 of the MMU 50 and the size of a storage unit 32 are set to be equal to each other.

The concatenation of storage units 32 should also be consistent with the CPU's execution address modes of the address bus 44. A concatenation of storage units 32 in the system should not include file system 16 links to other storage units 32 outside of the concatenated unit.

Modern CPU's 28 can execute from a wide variety of memory technologies, including read-only memory (ROM), erasable programmable read-only memory (EPROM), Flash, EEPROM (electrically erasable programmable read-only memory), static RAM (SRAM), synchronous dynamic RAM (SDRAM), and other memory technologies (collectively "memory technologies"). All of these memory technologies can be incorporated into the system 10. Nonvolatile technologies such as ROM can provide a permanent file system 16 while volatile technologies such as RAM will have to have a file system 16 loaded into them from either a ROM or some other storage media.

Modern MMUs 50 are programmable and typically offer several different page sizes 52. An executable file system 10 and the actual MMU 50 page size 52 must be matched. If MMU address translation is taking place, the executable binary must be compatible with the translation.

Modern CPUs 28 typically execute instructions from linearly addressed contiguous memory components, although still use paged memory. This requires an executable binary to be linearly addressable and to be contiguous and subsequently requires the executable files system's 10 units of storage 32 to be linearly placed and contiguous.

The provision of a directory and file structure takes advantage of the history of storage file systems 16 and user familiarity with the paradigm. Part of the paradigm is the concept of access control. If the operating system (OS) is one of the UNIX variants, then this can include the concepts of user-id, group-id, and read/write/execute privileges.

IV. Building Executable File Systems

Whether the binary file is an entire software application such as a computer program 18, a data file 22, or a shared library component 20, it must exist in a memory (e.g. executable memory 24) from which the CPU 28 can execute. It is not sufficient to just be in memory. Once a software package is compiled, assembled, and linked in an executable binary, it has address dependencies.

Figure 6:
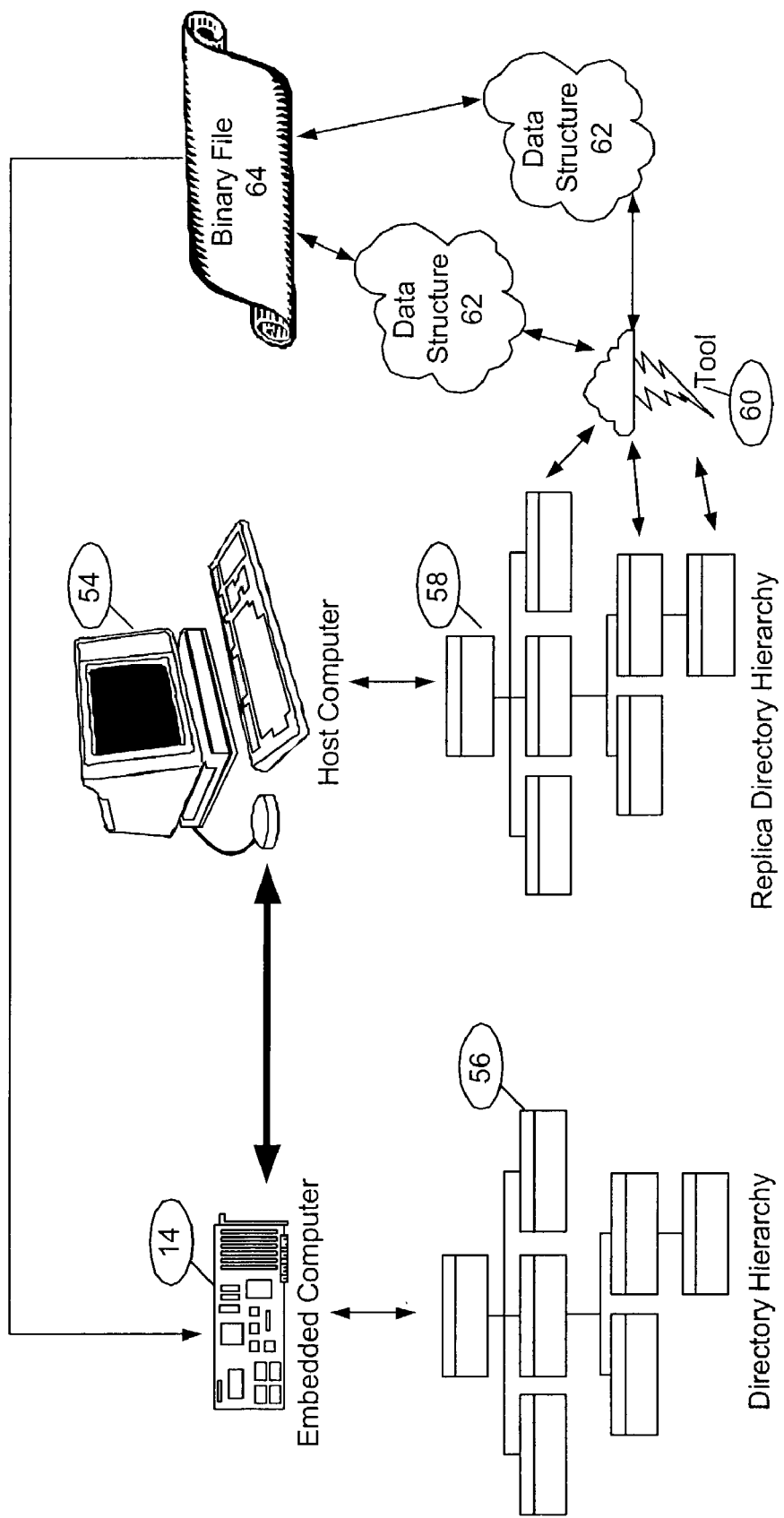
FIG. 6 is process flow diagram illustrating an example of how a replica directory hierarchy and a pre-runtime tool can be used to generate a binary file that can be loaded into an executable file system in an embedded computer.

FIG. 6 is a process flow diagram illustrating one example of how executable file systems 10 can be created and loaded into an embedded computer 14. A directory hierarchy 56 dictated by the various address dependencies of the software components to be executed in the embedded computer 56 is replicated to a host computer 54 which is used to create and then load the binary files. Examples of address dependencies include function calls, jump tables, object-based dependencies, and other types of interrelationships between various software components. The resolution of these address dependencies must occur before the CPU 28 can create a binary file for execution. A prior art operating system ("OS)"), the OS will typically resolve the dependencies at runtime when it copies the executable from a storage medium into memory (see FIG. 2). This is not done earlier because the actual destination address in memory is not known until the OS is asked to load and run the binary.

In an executable file system 10, the binary file is executed in the place that it is stored. A pre-runtime tool ("tool") 60 can be used to perform the normal OS address resolution and generate the actual executable binary to be included in the executable file system-10. One embodiment of the tool 60 would have it create the entire content of the executable file system 10 from a predefined list. The tool 60 would have to know where the file system 16 is being placed in memory before it could locate and/or resolve each binary file in a linear manner.

An executable file system 10 will have its contents preloaded and located to a specific memory location just as if this had been done at runtime by the target OS. A tool 60 that replicates the target OS's behavior is only part of the solution in a preferred embodiment. The OS itself should recognize the unique properties of an executable file system 10. Namely, that the system 10 does not have to load and relocate an executable. It should also know that it does have to setup the executable with respect to the MMU 50. FIG. 6 is one illustration of how this can occur.

A replica directory hierarchy 58 on the host computer 54 is used to reconcile and resolve the various dependencies, and perform other functions similar to what an operating system would do at run time in terms of gathering the necessary software components needed to executing a computer program 18. The tool 60 can traverse the replica hierarchy 58 and create the executable file system 10 from the replica hierarchy 58. The building of a binary file(s) 64 for loading as an executable file system can be incorporate one or more internal data structures 62 that are filled by the tool 60. Data structures can include arrays, objects, and a wide variety of other potential data structures. In a preferred embodiment, objects are filled in such a way as to mirror the hierarchy of the replica directory hierarchy 58 for efficient linear loading into the binary file 64.

FIG. 7 is a high level flow chart illustrating one example of a process for building the system 10. Address resolution is performed at 102. The executable binary is generated at 103. At 104, the executable binary is loaded into the embedded computer 14 using the host computer 54. These processes are described both above and below.

FIG. 8 is a more detailed flow chart illustrating an example of a process for building the system 10. A directory hierarchy is created at 106. This can be done using replication, a pre-runtime tool 60, actual execution of the software components in a host or other environment, or any other number of ways. A tool can traverse the hierarchy at 108. Alternative embodiments may utilize the actual execution of the software triggering actions of the operating system that can be monitored to accurately capture dependency information.

Thus data structures can be filled at 110. This step is not required in all embodiments of the system 10. The generation of the binary file at 112 is a required step, although there are many different ways in which the binary file can be generated.

Once the binary file is generated at 112, it can be loaded into the embedded computer 114 through the host computer 54, along with the entire executable file system.

Differences between the embedded computer 14 and the host computer 54 can raise extra obstacles. The file systems between the embedded computer 14 and the host computer 54 should be compatible if dependency information is to be traversed with the tool 60. For example, a DOS host 54 will not be able to support a file system 16 for a UNIX target embedded computer ("target") 14.

In order to support as a minimum, a UNIX-like file system 16 from a non-Unix Host computer 54, the tool 60 will need to support the functionality of certain UNIX commands. Such commands can be used in a script and parsed by the tool 60. The script can be used to precisely define the contents of the executable file system 10:

| | |
|---|---|
| cp [-R][-p] src dest | "copy" command |
| mkdir [-m mode][-p] dirpath | "make directory" command |
| chmod mode[, mode][-R] filedir | "change mode" command |
| chown owner[:group][-R] filedir | "change owner id" command |
| ln [-s] src dest | "link" command |
| cd dirpath | "change directory" command. |

The above commands should follow a GNU (a recursive acronym for "GNU's Not Unix", and refers to the standards and behavior definitions set by the Free Software Foundation) definition of behavior (or some other widely accepted standard) and the above options may be expanded with and/or replaced with their POSIX (portable operating system for Unix) equivalents. The following commands are peculiar to placing an executable file system 10 into memory.

Certain partition options of the "partition definition" command should be incorporated into the system 10:

| | |
|---|---|
| "address hex_value" | hexadecimal origin of the partition (the default is to start on the next natural boundary) |
| "min dec_value" | minimum size of the partition |
| "max dec_value" | maximum size of the partition |
| "prefix/postfix" | defines how executables are added, prefix declares executables will be added before those already placed (descending address values), while postfix will be added after them (ascending address values). |
| "raw" | all files are pre-located and are placed "as is" in the sequence as they are encountered without alignment or padding between files |
| "fat_data" | causes the file allocation table data to be placed at the end of the partition. |

Certain device options for a "memory device definition" command are also desirable in a preferred embodiment of the system:

| | |
|---|---|
| "address hex_value" | hexadecimal origin of the device |
| "min dec_value" | minimum size of the device |
| "max dec_value" | maximum size of the device |
| "page dec_value" | decimal size of the MMU page. |

The "device" command can provide global data so the physical origin in memory, the MMU page size 52, and the sizes of memory 32 can be comprehended during the file system 16 construction. The device is assumed to be non-volatile memory. This command would typically be the first command in'the script. The "min" and "max" options define the amount of memory the entire file system 16 will be allocated. Since a system can contain a variety of memory types at different addresses, a device is partitioned in order to group the executables within the partitions.

The "partition" command identifies a set of executables that are to be placed in a common memory area. If the device is a memory from which the CPU 28 can execute, an obvious place to locate a partition would be within the device. Another option is to place a partition in RAM. Partitions that are located within the device can be used in place. Partitions in RAM must have their binary data copied before it can be used. The "address" option defines where the partition will ultimately reside. If the address does not fall within the address range of the device, then a copy is implied. An opportunity exists to store a compressed image of such partitions and perform decompression during the copy. The "min" and "max" options define the size of memory allocated for the partition. The "prefix|postfix" option defines whether executables will be prefixed with respect to the origin as they are encountered or postfixed. This can allow the file system 16 to grow from a small address to a large address, or from large to small. The "raw" option requires the partition to be filled with pre-located executables. Such executables typically consist of interrupt vectors, reset bootstrap code, and the OS startup code. The order of file declaration explicitly controls the placement of executables. The file system's 16 file allocation table can be placed explicitly with the "fat_data" option or by default it can follow the last executable in the last partition. In a preferred embodiment, the file system 16 will have at least two partitions, a raw partition for boot code and a non-raw partition to hold the system's 10 executables. A "loader" program that copies partitions could be co-located with the file allocation table and called by the OS startup code.

The file system 16 can be described by "constructing" it with the above commands. The tool 60 can populate the internal data structure 62 by parsing these commands. The tool 60 can then collect the source files for a partition and locate them according to their last position with respect to the origin, other partitions and the accumulated size of the file system 10. The final output of the tool 60 can be a binary file 64 that can be placed into a memory device, such as the embedded computer 14.

VI. Using the Executable File System

The OS will require access to the executable file system 16. A suitable file system driver can provide this access. The driver can use information in the file allocation table in order to locate the executables in memory. The ability to distinguish ownership and access privileges will be supported according to the OS's ability to do so. The system 10 does not impede such functionality.

The OS should also be aware of the special nature of the executable file system 16. The OS should recognize that the file it is attempting to "load and run" can actually be executed in place within the file system 16. Cooperation between the file system driver and the OS will allow the OS to discover the location (e.g. physical memory address) of the executable and any other information necessary for the OS to map the physical memory into its executable memory.

In a preferred embodiment of the system 10, "non-executable" files can be included. Read-only data and other types of data files 22 can be incorporated. Part of this option would be to make the file system 16 publicly available instead of private to the OS, so that other software components can access the data files 22 using standard file operations.

An executable file system 16 builds upon the concept of using a linker to place executable binaries into a memory image. A file system 16 paradigm is used to describe and define a collection of executable binaries. Modern OS and non-expert users already understand this paradigm. By extending the file system 16 and OS to include the knowledge that the file system 16 is located in memory and that the CPU 28 can directly execute it, the file system 16 can be populated with binaries that can be executed in place. The ability to control where the executables are placed in terms of memory type can offer added control over system 10 resources and performance.

VI. Alternative Embodiments

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A computer system embedded in a machine for control of an aspect of the operation of the machine, the computer comprising:
    a central processing unit;
    a non-volatile executable memory for the central processing unit; and
    an executable file system stored in the executable memory space and comprising:
    a plurality of software components permanently stored in the executable memory, wherein each software component in said plurality of software components is a binary file directly executable by the processing unit from its permanently stored location without code interpretation or translation, wherein said binary file is generated by a host/loading computer using a pre-runtime tool; and
    an additional software component addressable by the central processing unit and containing data comprising a starting address in the executable memory for each of the plurality of software components and instructions to the central processing unit for executing each of the plurality of software components beginning at the associated stored address in the executable memory.

2. The computer system of claim 1, further comprising a unit of storage and wherein said executable file system includes a unit of storage interface.

3. The computer system of claim 2, wherein said central processing unit controls said unit of storage interface.

4. The computer system of claim 3, wherein said central processing unit directly controls said unit of storage interface.

5. The computer system of claim 3, wherein said unit of storage interface is a read/write means.

6. The computer system of claim 3, wherein said unit of storage interface is an identifying location means.

7. The computer system of claim 3, wherein said unit of storage interface is a concatenation means.

8. The computer system of claim 3, wherein said unit of storage interface includes a read/write means, an identifying location means, and a concatenation means.

9. The computer system of claim 2, wherein said central processing unit includes a page size set to said unit of storage.

10. The computer system of claim 2, wherein said central processing unit includes an address bus;
    wherein said file system includes a concatenation means; and
    wherein a concatenation of said unit of storage is consistent with said address bus.

11. The computer system of claim 2, wherein said unit of storage does not contain a file system link to any other units of storage in said embedded computer.

12. The system computer of claim 1 wherein each of the plurality of binary files comprises microprocessor specific instructions and data adapted for direct copying into the instruction and other operating registers of the microprocessor, as appropriate for their execution.

* * * * *